United States Patent [19]
Tan

[11] Patent Number: 5,823,857
[45] Date of Patent: Oct. 20, 1998

[54] APPARATUS AND METHOD FOR PRECISION GRINDING OF FACE GEARS

[75] Inventor: Jie Tan, Mesa, Ariz.

[73] Assignee: McDonnell Douglas Helicopter Company

[21] Appl. No.: 680,932

[22] Filed: Jul. 16, 1996

Related U.S. Application Data

[60] Provisional application No. 60/016,052, Apr. 23, 1996.

[51] Int. Cl.⁶ ........................................ B23F 23/10
[52] U.S. Cl. ................................ 451/47; 451/56; 451/72; 451/161
[58] Field of Search ................................ 451/47, 56, 547, 451/542, 147, 161; 407/24, 26, 28, 23

[56] References Cited

U.S. PATENT DOCUMENTS

| | | | |
|---|---|---|---|
| 2,304,586 | 12/1942 | Miller | 407/23 |
| 4,518,287 | 5/1985 | Bossler, Jr. | 409/26 |
| 4,954,028 | 9/1990 | Seroo et al. | 451/47 |
| 5,135,442 | 8/1992 | Bossler, Jr. | 475/1 |
| 5,178,028 | 1/1993 | Bossler, Jr. | 74/416 |
| 5,233,886 | 8/1993 | Bossler, Jr. | 74/665 F |
| 5,289,815 | 3/1994 | Krenzer | 451/47 |
| 5,411,431 | 5/1995 | Basstein et al. | 451/47 |
| 5,494,475 | 2/1996 | Basstein et al. | 451/47 |

*Primary Examiner*—Robert A. Rose
*Attorney, Agent, or Firm*—Donald E. Stout

[57] ABSTRACT

A precision grinding apparatus includes a grinding worm for precision grinding a case-hardened face gear. A shaper is first placed into contact with a face gear, to thereby shape a surface of the face gear into a plurality of face gear teeth. The shaper is then removed, and the face gear is case hardened. The grinding worm is disposed in a normal orientation to the case-hardened face gear and includes a spiral tooth extending along a perimeter of the grinding worm. The spiral tooth of the grinding worm is adapted to contact and precision grind the case-hardened gear. A dressing tool includes a protrusion for contacting the spiral tooth of the grinding worm, as the spiral tooth contacts and precision grinds the case-hardened face gear. The dressing tool thus maintains the shape of the grinding worm to within a desired tolerance range.

5 Claims, 8 Drawing Sheets

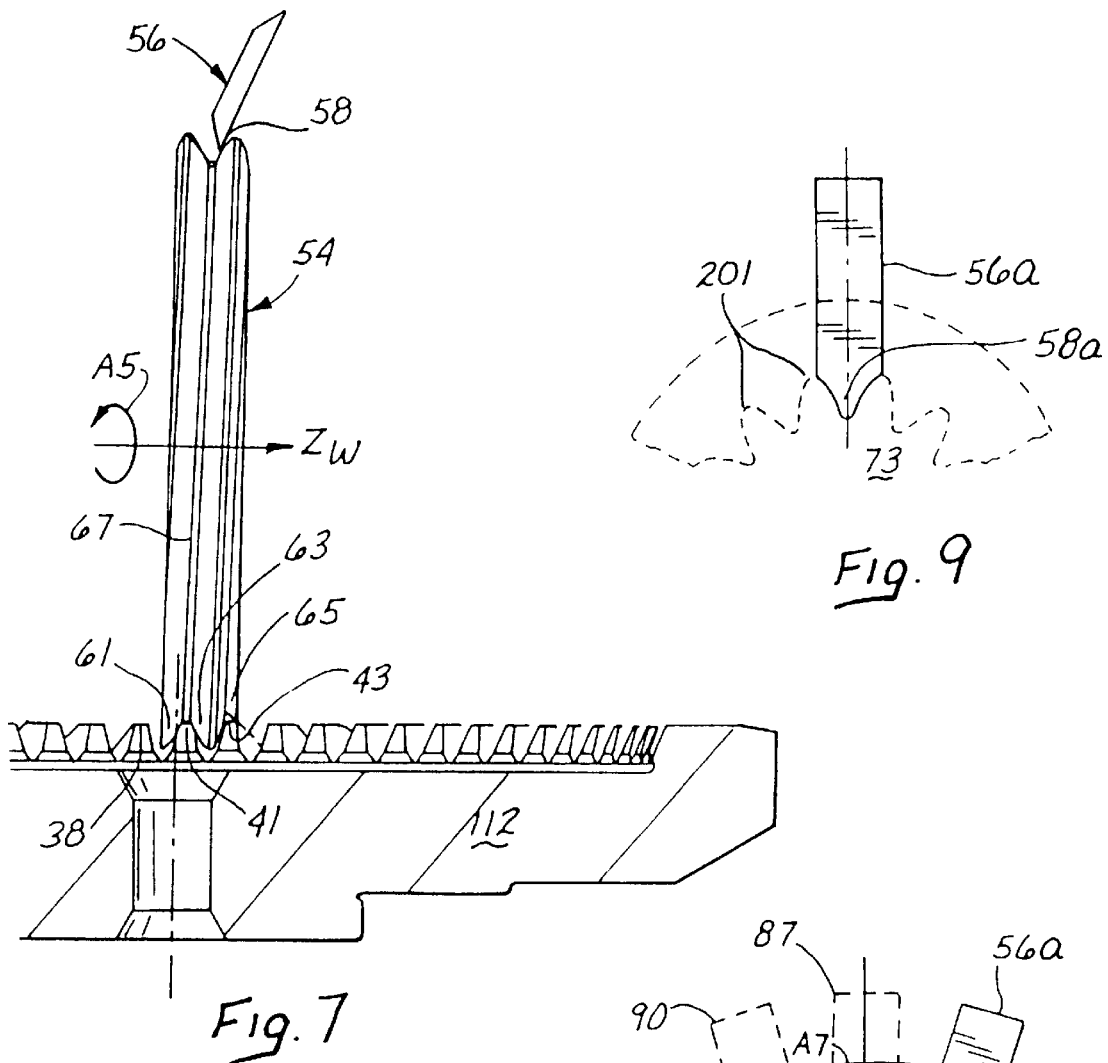
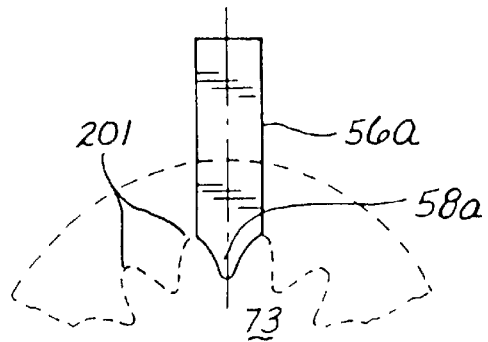
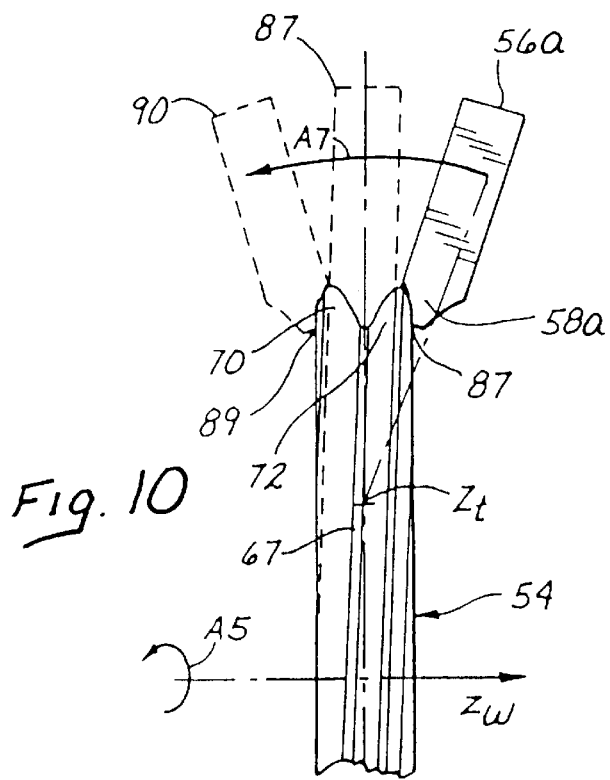

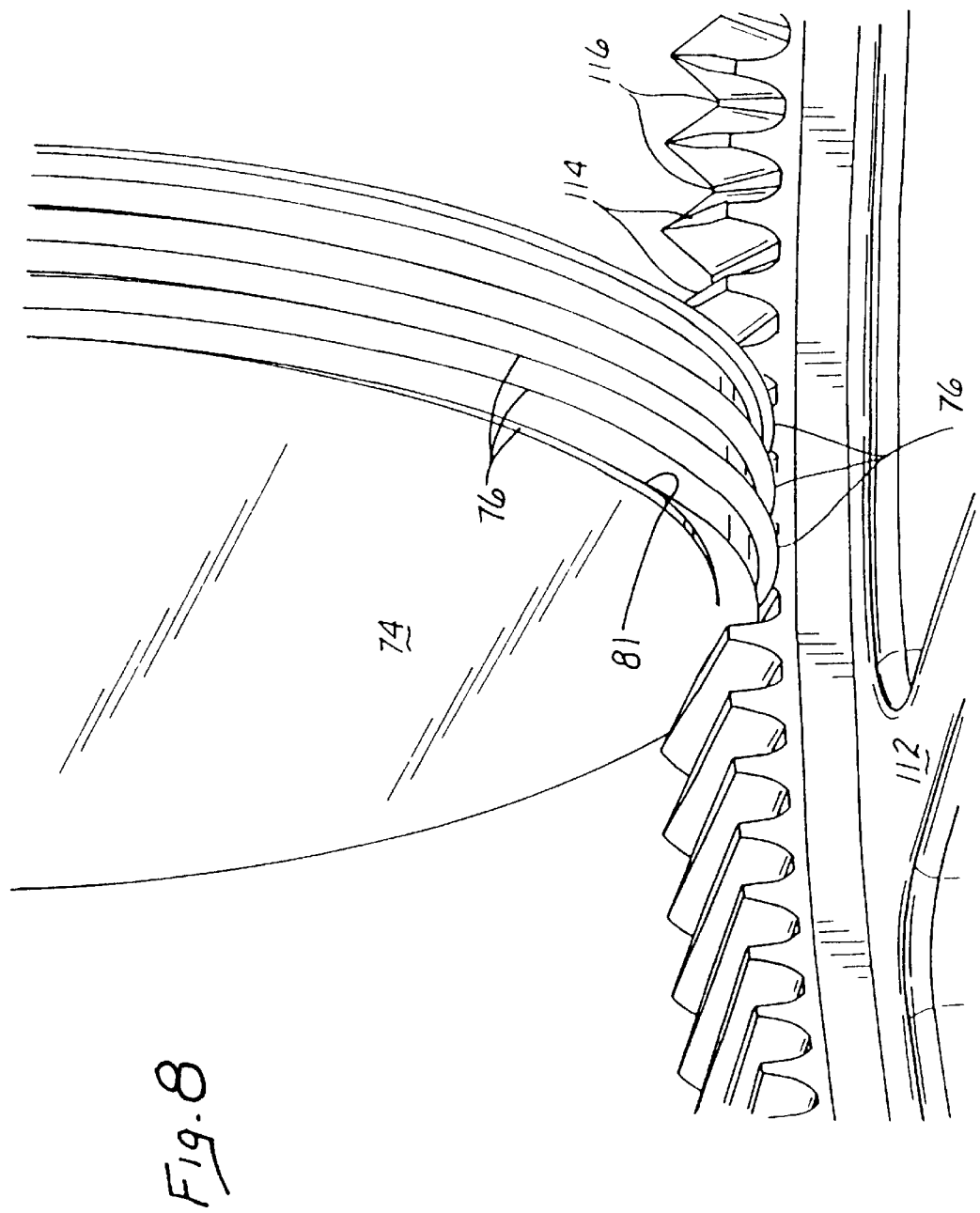

APPARATUS AND METHOD FOR PRECISION GRINDING OF FACE GEARS

This application claims the benefit of U.S. provisional application Ser. No. 60/016,052, filed Apr. 23, 1996.

BACKGROUND OF THE INVENTION

1. Field of the Invention

The present invention relates generally to the manufacture of face gears and, more particularly, to a face gear grinding apparatus having both a worm-shaped wheel and a dressing tool for use on the worm-shaped wheel.

2. Description of Related Art

Face gears are widely used in low power applications, but often are not strong enough for use in high power applications. Present manufacturing methods for cutting face gear teeth incorporate hobs or shapers. FIG. 1 illustrates a face gear 12 having face gear teeth 14 and face gear gaps 16. A shaper gear 18 comprises shaper gear teeth 21 and shaper gear gaps 23. The shaper gear 18 rotates about a shaper gear axis of rotation $Z_s$ with a shaper gear rotational velocity $\omega_s$. The face gear 12 rotates about a face gear axis of rotation $Z_g$ with a face gear rotational velocity $\omega_g$. As the shaper gear 18 rolls over the face gear 12, the shaper gear teeth 21 and the shaper gear gaps 23 form the face gear gaps 16 and the face gear teeth 14, respectively. The shaper gear 18 further comprises a shaper gear y-axis $Y_s$ and a shaper gear x-axis $X_s$. The face gear 12 comprises a face gear y-axis $Y_g$ and a face gear x-axis $X_g$.

The face gear teeth 14 and the face gear gaps 16 accommodate a spur gear during regular operation, after the face gear 12 has been shaped by the shaper gear 18 and the shaper gear 18 removed. The conventional face gear teeth 14 and face gear gaps 16, after being formed by the shaper gear 18, are not sufficiently strong for high power applications. The face gear 12 may be case hardened to thereby increase the strength and wear characteristics of the face gear teeth 14 and face gear gaps 16. Case-hardening techniques, such as carburizing and nitriting heat-treat methods, induce distortions in the face gear teeth 14 and gaps 16 of the face gear 12. These distortions prevent smooth operation of the spur pinion on the face gear teeth 14 and, further, the shaper gear 18 is not appropriate for attenuating the distortions in the hardened face gear 12. Grinding processes have been used in the past for finishing gear tooth surfaces in gears other than face gears, when the gears have been heat treated to a high hardness level after being originally cut.

As an alternative to the shaper gear 18, a hob 25 may be used for forming the face gear teeth 14 and face gear gaps. As shown in FIG. 2, the hob 25 typically comprises an axis of rotation 27 and a plurality of hob teeth 30 and recessed areas 31 disposed along the perimeter of the hob 25. As the hob 25 is rotated about the axis of rotation 27 in the direction of the arrow A1, the hob teeth 30 cut into the face gear 12 to thereby form the face gear teeth 14 and face gear gaps 16. U.S. Pat. No. 2,304,588 to Miller discloses such a hob used for cutting teeth into a face gear.

An end view of the hob 25 contacting the face gear 12 is illustrated in FIG. 3. The hob 25 comprises a first hob tooth 32, a second hob tooth 34, and a third hob tooth 36. As the hob 25 rotates about the axis of rotation 27 (FIG. 2), the first hob tooth 32 contacts the first face gear tooth 38. Additionally, the second hob tooth 34 and the third hob tooth 36 contact the second face gear tooth 41. The first, second, and third hob teeth 32, 34, and 36 machine (or cut) the first and second face gear teeth 38 and 41. This machining process, however, is not suitable for use on a case-hardened face gear. Additionally, the hob teeth 30 are not properly shaped and, consequently, the face gear teeth 14 of the Miller apparatus are not correctly cut.

FIG. 4 illustrates a dressing spur 45, which is used to dress or true the hob 25. As the hob teeth 30 cut into the face gear 12 (FIG. 3), the hob teeth 30 begin to dull or lose their sharp edges. The dressing spur 45 is used to true or dress these hob teeth 30. The dressing spur tooth 47 fits between and contacts the first hob tooth 32 and the second hob tooth 34. The hob 25 is rotated about its axis in the direction of the arrow A2 as the dressing spur tooth 47 contacts the first hob tooth 32 and the second hob tooth 34. This dressing spur tooth 47 comprises a first convex surface 50 and a second convex surface 52. The dressing spur 54 must be moved along the directions of the arrows A3 and A4 to facilitate movement of the double convex dressing spur tooth 47 between the first hob tooth 32 and the second hob tooth 34, as well as between additional hob teeth.

The shape of the double convex dressing spur tooth 47 results in the incorrectly shaped hob teeth 30, which eventually results in the incorrectly formed face gear teeth 14. The errors in the face gear teeth of the Miller patent appear to be at least 40 to 50 microns off from the desired surface. These slight variations result in, among other things, slight variations in the face gear rotational velocity $\omega_g$ during normal operation. Since the hob 25 is not suitable for cutting case-hardened steel, face gears formed by the Miller technique cannot be used in high power applications. Additionally, the dressing spur 45 is not applied to the hob 25 during cutting of the face gear 12. Thus, the shapes of the hob teeth 30 are not accurately maintained during the cutting of the face gear teeth 14 and, further, extra time must be spent after the cutting process to dress the hob 25. Moreover, the cutting of the face gear teeth 14 by the hob teeth 30 may tend to stress the face gear teeth 14. A need exists in the prior art for an apparatus which can generate a hardened face gear with high precision.

SUMMARY OF THE INVENTION

The apparatus of the present invention is adapted for precision grinding a face gear to desired specifications. The apparatus of the present invention is especially suitable for precision grinding a face gear made of case-hardened steel. According to the present invention, a grinding worm tool is used to precision grind the face gear, and a dressing tool can be simultaneously implemented to dress the grinding worm tool.

The precision grinding apparatus of the present invention includes a grinding worm for precision grinding a case-hardened face gear. A shaper is first placed into contact with a face gear, to thereby shape a surface of the face gear into a plurality of face gear teeth. The shaper is then removed, and the face gear is case hardened. The grinding worm is disposed in a normal orientation to the case-hardened face gear and includes a spiral tooth extending along a perimeter of the grinding worm. The spiral tooth of the grinding worm is adapted to contact and precision grind the case-hardened gear.

A dressing tool includes a protrusion having a planar surface for contacting the spiral tooth of the grinding worm, as the spiral tooth contacts and precision grinds the case-hardened face gear. The dressing tool thus maintains the shape of the grinding worm to within a desired tolerance range. The grinding worm rotates about a rotational axis of the grinding worm and advances around the case-hardened face gear, to thereby contact and grind each of the teeth of the case-hardened face gear. The planar surface of the dressing tool fits within a gap formed by the spiral tooth of the grinding worm. As the grinding worm rotates about its rotational axis, the planar surface of the dressing tool enters a portion of the gap near a first side of the grinding worm, and eventually exits a second portion of the gap near a second side of the grinding worm.

The case-hardened face gear is adapted to mesh with a spur pinion during regular operation. The spur pinion includes teeth and internal sectors located between the teeth which mesh with the teeth of the case-hardened face gear. Movement of the planar surface of the dressing tool along the gap formed by the spiral tooth simulates movement of the dressing tool across a surface of the spur pinion.

A rotational axis of the face gear is substantially perpendicular to a rotational axis of the grinding worm. The grinding worm includes a front side, back side, and a circular perimeter connecting the front side to the back side. The spiral tooth is disposed on the circular perimeter of the grinding worm. The spiral tooth begins near the front side of the grinding worm and ends near the back side of the grinding worm. The front side of the grinding worm defines a first plane, and the back side of the grinding worm defines a second plane, with the first plane being substantially parallel to the second plane. A line, which is substantially perpendicular to the first and second planes, is not substantially perpendicular to a radial line of the face gear extending through the rotational axis of the face gear and also passing through a portion of the face gear contacted by at least one tooth of the grinding worm.

According to the method of the present invention, the grinding worm is placed into contact with the face gear to thereby precision grind the plurality of face gear teeth. The dressing tool can be simultaneously placed into contact with the grinding worm to thereby dress the grinding worm. Placement of the dressing tool into contact with the grinding worm while the grinding worm is precision grinding the plurality of face gear teeth maintains the geometry of the teeth of the grinding worm.

The present invention, together with additional features and advantages thereof, may best be understood by reference to the following description taken in connection with the accompanying illustrative drawings.

BRIEF DESCRIPTION OF THE DRAWINGS

FIG. 7 is a side elevational view of a face gear, grinding worm, and dressing tool according to the present invention;

FIG. 8 illustrates the dressing tool of the present invention, fitting snugly between two teeth of a spur pinion adapted for meshing with the face gear of the present invention;

FIG. 9 illustrates a grinding worm according to an alternative embodiment of the present invention;

FIG. 10 illustrates the grinding worm of the alternative embodiment grinding the teeth of a face gear;

DETAILED DESCRIPTION OF THE PRESENTLY PREFERRED EMBODIMENTS

Figure 5:
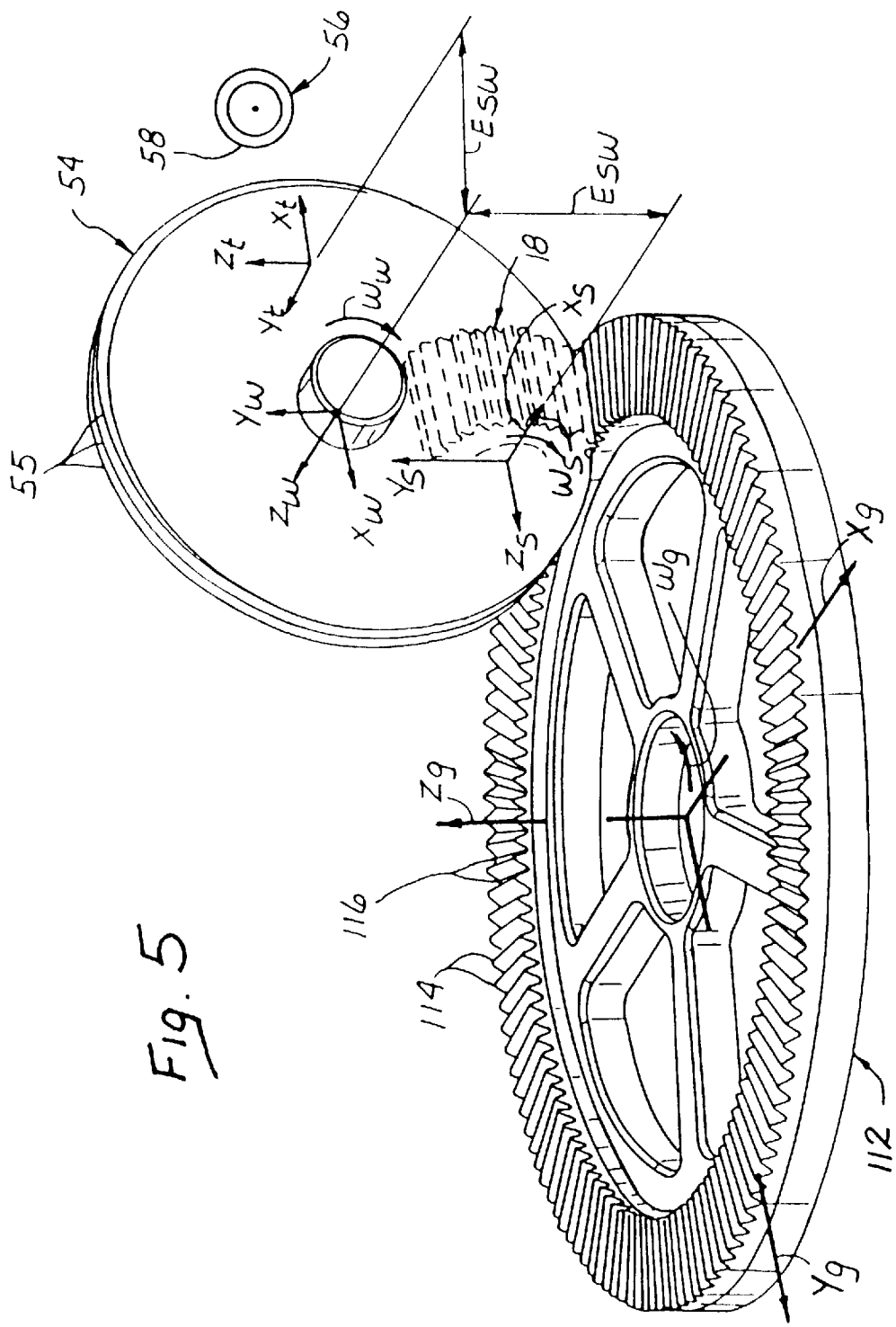
FIG. 5 illustrates a face gear, grinding worm, and dressing tool according to the present invention.

Turning to FIG. 5, a grinding worm 54 according to the presently preferred embodiment is illustrated on the face gear 112. The grinding worm 54 rotates about a grinding worm z-axis $Z_w$ with a grinding worm rotational velocity $\omega_w$. The grinding worm further comprises a grinding worm x-axis $X_w$ and a grinding worm y-axis $Y_w$. A plurality of grinding worm teeth 55 contact the face gear 12 as the grinding worm 54 rotates with rotational velocity $\omega_w$, the grinding worm teeth travel within the face gear gaps 116 to thereby rotate the face gear 112 with the face gear rotational velocity $\omega_g$. The face gear teeth 114 fit between the grinding worm teeth 55. A single, spiral gap runs along the outer perimeter of the grinding worm 54 between the grinding worm teeth 55. This spiral gap serves to progress the grinding worm 54 over the various face gear teeth 114. Specifically, as the grinding worm 54 rotates with rotational velocity $\omega_w$, a given face gear tooth enters the spiral gap and travels within the spiral gap for several rotations of the grinding worm 54, until the given face gear tooth exits the spiral gap. The spiral gap begins on a point of the grinding worm perimeter in the positive $Z_w$ direction, and ends on a point of the grinding worm perimeter in the negative $Z_w$ direction. This spiral gap along the perimeter of the grinding worm 54 results in relative movement of the grinding worm 54 in a counterclockwise direction along the face gear 112, as the grinding worm 54 rotates with rotational velocity $\omega_w$.

Figure 1:
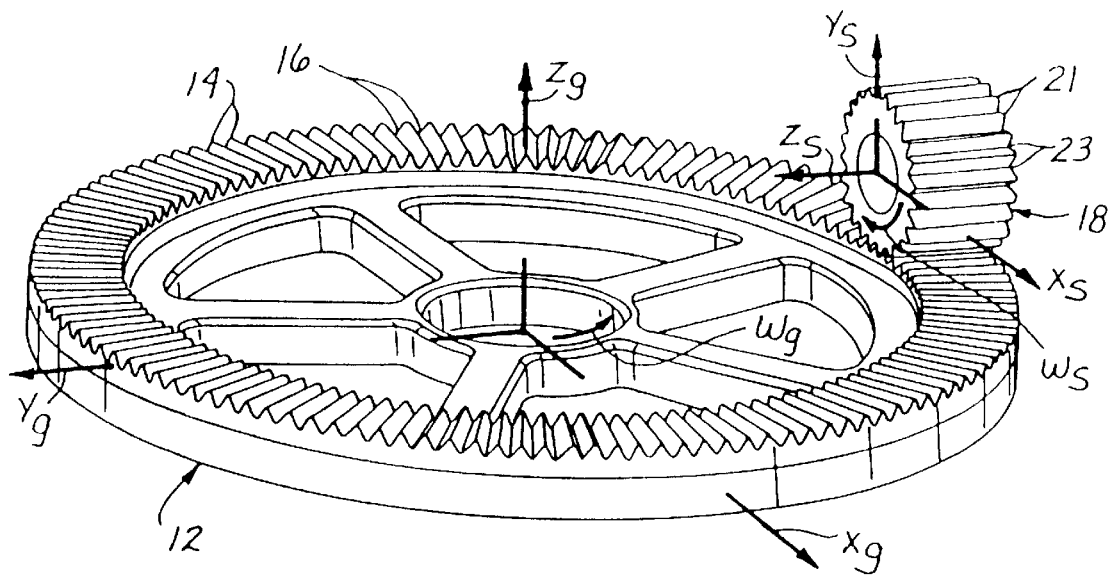
FIG. 1 illustrates a face gear and a shaper of the prior art.
Figure 2:
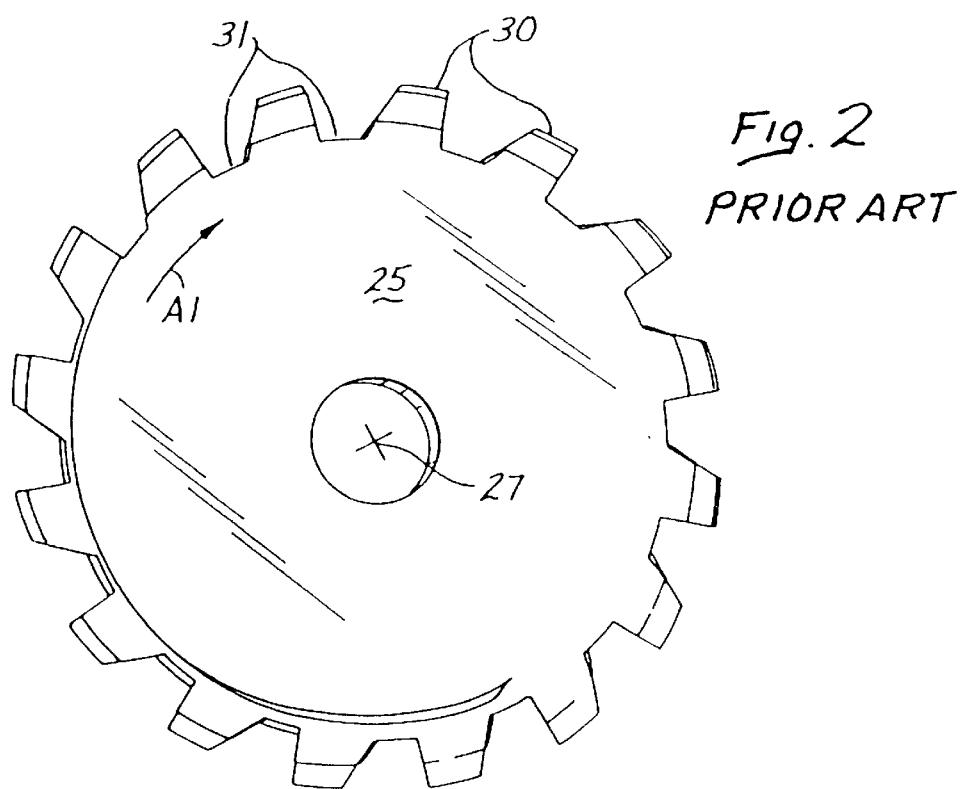
FIG. 2 illustrates a hob of the prior art.

The face gear 112 is similar to that shown in FIG. 1, except that the face gear 112 has been hardened after initial shaping by and removal of the shaper gear 18 shown in phantom in FIG. 5. The face gear 112 may be hardened by either a carburizing or nitriting heat-treat method, either of which introduces distortions into the geometry of the face gear teeth 114 and face gear gap 116. The grinding worm 54 performs a precision grinding on the face gear teeth 114 to thereby attenuate these distortions. In the presently preferred embodiment, the grinding worm comprises an abrasive-medium type material, such as a dressable CBM-type or other type of material that is conventionally used in spiral bevel and other types of gears.

In addition to the relative counterclockwise movement of the grinding worm 54 along the face gear 114, the grinding worm 54 also moves in a radial direction along the face gear 112. This movement of the grinding worm 54 in the radial direction of the face gear 112 ensures that the entire radial length of each face gear tooth 114 is precision ground by the grinding worm 54. In the presently preferred embodiment, the grinding worm 54 moves in the radial direction at a very slow rate, so that an insignificant amount of radial movement occurs with each rotation of the grinding worm 54 around the face gear 112. For example, the grinding worm 54 may begin rotating about the face gear teeth 114 with its rotational axis $Z_w$ located above the outer edge of the face gear 112. After thirty or more counterclockwise rotations of the grinding worm 54 around the face gear 112, the rotational axis $Z_w$ of the grinding worm 54 may be located substantially over the inner edges of the face gear teeth 114. Alternatively, the grinding worm 54 may be indexed in the radial direction of the face gear 112 with each relative rotation of the grinding worm 54 about the face gear 112. The grinding worm 54 may be indexed 1/30 of the length of a face gear tooth 114 with each revolution of the face gear 112, for example. This corresponds to a feed rate of 30, but the feed rate may be as low as 10 to 15.

In the presently preferred embodiment, the grinding worm 54 does not move around the circumference of the face gear 112 but, instead, the face gear 112 rotates with the face gear rotational velocity $\omega_g$ beneath the grinding worm 54. The relative motion between the grinding worm 54 and the face gear 112 may be controlled by a gear train, and is preferably controlled by a mechanical control machining process. The rotational velocity $\omega_w$ of the grinding worm 54 is determined by the spiral gap of the grinding worm 54. A programmed computer may be used to control the feed and speed rates. The program of the computer may allow for differently sized gears, different numbers and orientations of teeth, etc. The rotational velocities of the grinding worm 54 and of the face gear 112 may be controlled using feedback loops, for example, in combination with variable speed motors.

The surface of the grinding worm 54 is configured to comply with conjugate meshing of the face gear 112 tooth surface and the shaper gear 18 tooth surface. The dressing tool 56 is used to maintain the grinding worm teeth 55 in a state close to their original shapes, as the grinding worm teeth 55 precision grind the face gear teeth 114. This constant maintenance of the grinding worm teeth 55 by the dressing tool 56 insures that the grinding worm teeth 55 are maintained in their original shape and that the face gear teeth 114 are cut to close tolerance. Thus, the dressing tool 56 of the present invention serves to maintain the grinding worm 54 in essentially its original form throughout the grinding process.

The distance $E_{sw}$ denotes the presently preferred distance between the grinding worm rotational axis $Z_w$ and the dressing tool axis of rotation $Z_t$. This distance $E_{sw}$ is equal to the difference between the radius of the grinding worm 54 and the radius of the shaper gear 18 (shown in phantom). In other words, the distance $E_{sw}$ is the shortest distance between the axis of rotation of the grinding worm 54 and the axis of rotation of the shaper gear 18.

Figure 6:
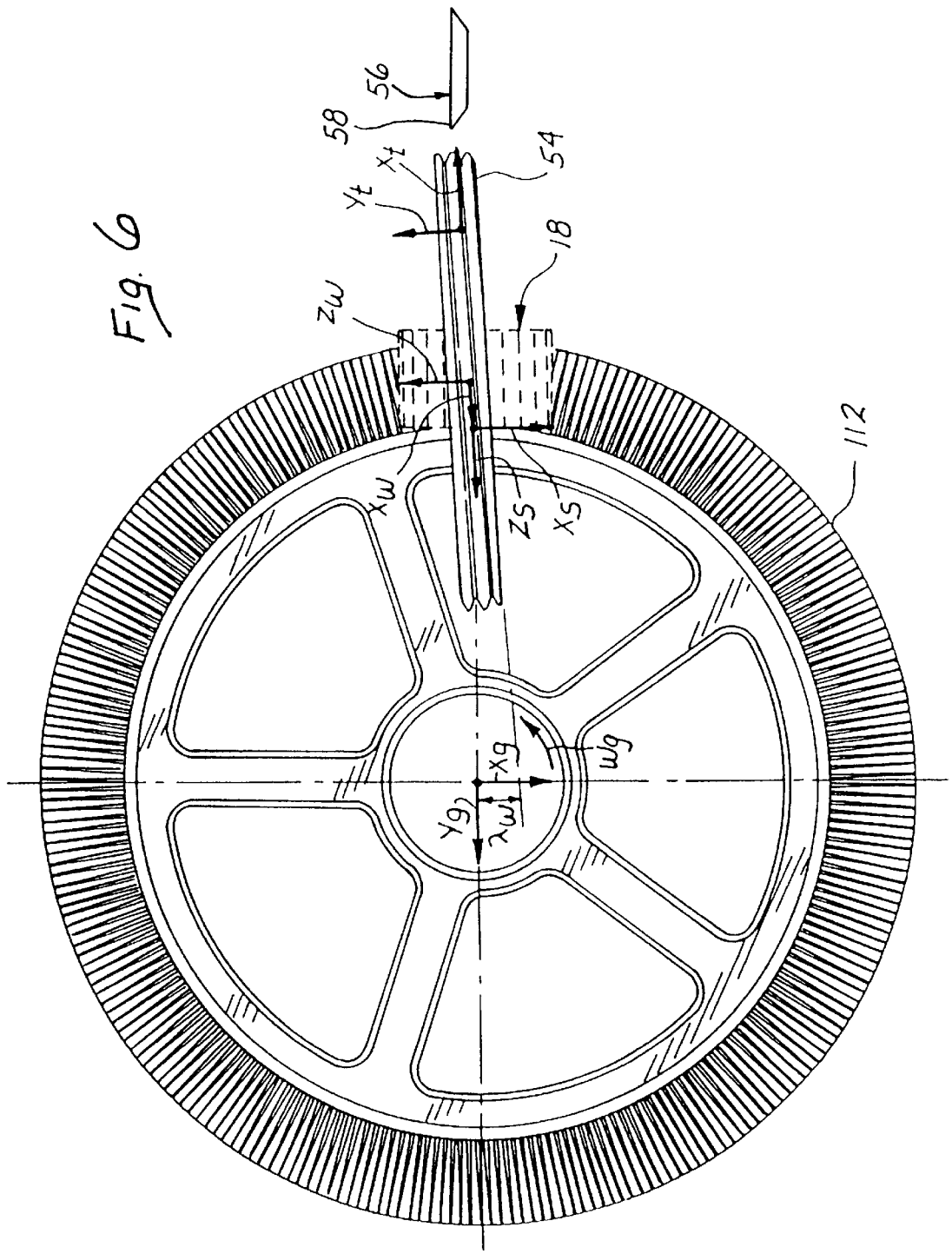
FIG. 6 is a plan view of the face gear, grinding worm, and dressing tool shown in FIG. 5.

As shown in FIG. 6, the grinding worm 54 is placed onto the face gear 112 at an angle slightly off from a radial line passing through the face gear axis of rotation $Z_g$. A line parallel to the grinding worm 54 forms an angle $\lambda_w$ with a line passing through both the face gear axis of rotation $Z_g$ and a point where, the grinding worm 54 contacts the face gear 112. The installment angle $\lambda_w$ describes the angle of the grinding worm 54, and is related to the shape of the grinding worm 54 tooth and the shape of the desired face gear 112 tooth. Since the teeth of the grinding worm 54 are spiraled, the grinding worm 54 must be angled relative to the face gear teeth 114 to provide for radial grinding of the face gear teeth 114. The plus sign corresponds to a right hand threaded worm and the minus sign corresponds to a left hand threaded worm. The plus or minus depends on the direction of the spiral in the grinding worm 54. The point where the grinding worm 54 contacts the face gear 112 lies beneath the intersection of the grinding worm x-axis $X_w$, the grinding worm y-axis $Y_w$, and the grinding worm z-axis $Z_w$. The shaper gear axis of rotation $Z_s$ and the grinding worm axis of rotation $Z_w$ are crossed and form an angle of 90 degrees plus or minus $\lambda_w$. If the installment angle $\lambda_w$ were zero, then the angle between the grinding worm axis of rotation $Z_w$ and the shaper gear axis of rotation $Z_s$ would be exactly 90 degrees, but the spiral teeth of the grinding worm require an installment angle $\lambda_w$. The installment angle $\lambda_w$ is determined by:

$$\sin(\lambda_w) = (N_w/N_w) * [r_{ps}/(r_{pa} + E_{sw})]. \qquad 1$$

The rotational motions of the grinding worm 54 and of the face gear 112 are related as follows:

$$\omega_w/\omega_g = N_g/N_w. \qquad 2$$

The grinding worm 54 performs translations parallel to the shaper gear axis of rotation $Z_s$. If a helical shaper gear is used, an additional rotation of the face gear 112 is required. In the presently preferred grinding method using a straight shaper gear 18, rotational indexing of the face gear is not required, and a continuous translational motion may be used. The deviations of the ground face gear tooth surface from the ideal face gear tooth surface depend on the number of revolutions of the face gear 112 performed in completing the grinding of the whole radial length of the face gear teeth 114. The deviations are negligible when the number of revolutions of the face gear 112 is in the range of 40 to 50. Of course, other numbers of revolutions may be used.

The shaper gear 18 shown in FIGS. 5 and 6 is shown in phantom for reference only. The shaper gear 18 does not contact the face gear 112 while the grinding worm 54 is contacting the face gear 112. The shaper gear 18 tooth surface generates the ideal tooth surface of the face gear 112 as the envelope to the family of shaper gear 18 tooth surfaces. In the process of generating the teeth of the face gear 112, the shaper gear 18 and the face gear 112 perform rotational motions about their intersecting axis $Z_s$ and $Z_g$ with the following ratio of angular velocities:

$$\omega_w/\omega_g = N_g/N_w. \qquad 3$$

Figure 4:
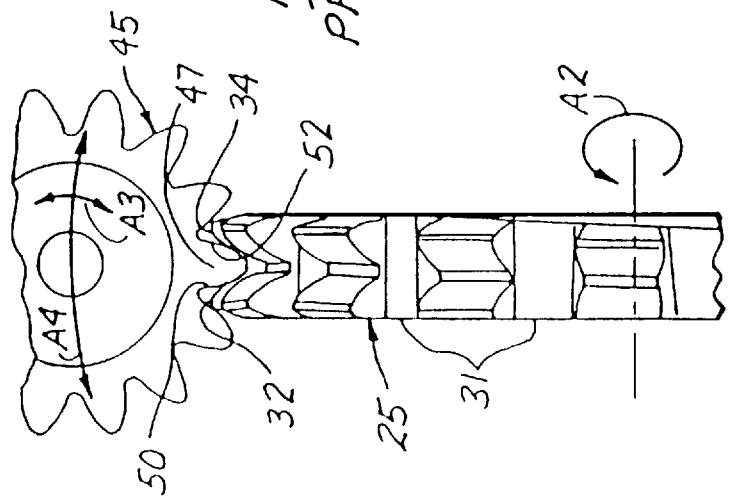
FIG. 4 illustrates a hob and a dressing spur of the prior art.
Figure 3:
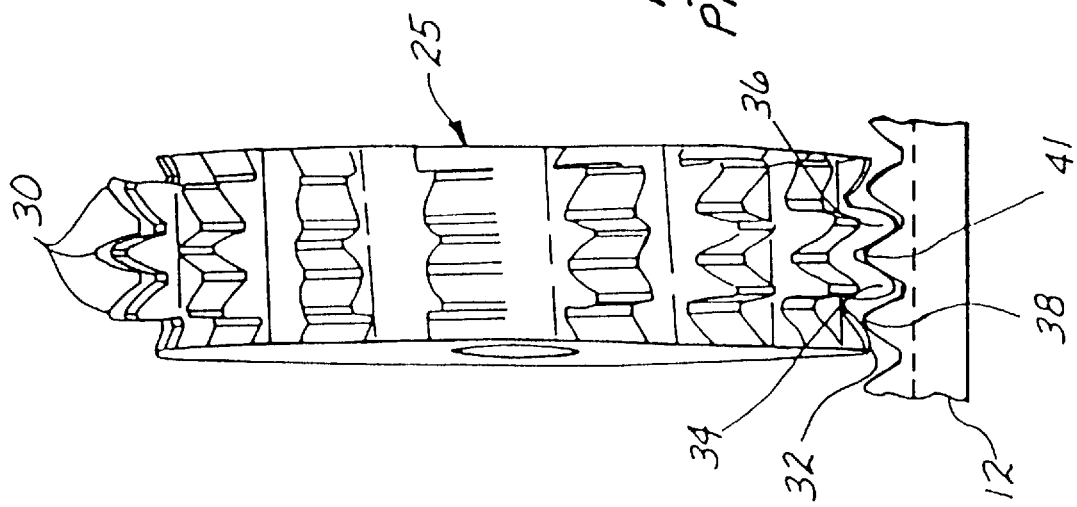
FIG. 3 illustrates a hob and a face gear of the prior art.

FIG. 7 illustrates a side view of the grinding worm 54 rotating about the grinding worm axis of rotation $Z_w$ in the direction of arrow AS, and grinding the teeth of the face gear 112. The dressing tool 56 is shown contacting the grinding worm 54 on a top surface thereof, but may be positioned to contact the surface of the grinding worm 54 along any portion thereof, except, obviously, where the grinding worm 54 is contacting the teeth of the face gear 112. The prior art teeth of the hob 25 were dressed with a double convex dressing spur tooth 47 (FIG. 4) and, consequently, the conventional hob teeth 30 (FIG. 3) were not accurately formed. Additionally, the conventional hob teeth 30 were only dressed before or after a cutting procedure and, thus, were not accurately maintained during the machining process. Of course, the presently preferred grinding worm 54 does not cut or machine the face gear 112 (as does the conventional hob) but, rather, precision grinds the face gear 112 after the face gear 112 has been case hardened, for example. The hob 25 of the prior art cannot operate to precision grind a case-hardened face gear.

As shown in FIG. 7, a single continuous grinding worm gap 67 passes over each of the teeth of the face gear 112. The single continuous grinding worm gap 67 forms a first grinding worm tooth 61, a second grinding worm tooth 63, and a third grinding worm tooth 65. The three grinding worm teeth 61, 63, 65 are shown operating on a first face gear tooth 38, a second face gear tooth 41, and a third face gear tooth 43. Thus, the dressing tool 56 forms the teeth of the grinding worm 54 into the teeth of a simulated spur pinion 73, for subsequent application and grinding of the teeth of the face gear 112.

Although the grinding worm 54 is shown having first, second, and third grinding worm teeth 61, 63, and 65, other embodiments of the grinding worm 54 may comprise fewer or greater teeth. The alternative grinding worm 74 shown in FIG. 8 comprises a single continuous grinding worm gap 81 and at least five grinding worm teeth 76. The alternative grinding worm 74 is shown precision grinding the teeth of a face gear 112.

The grinding worm 54 (FIG. 7) of the presently preferred embodiment comprises a complex surface, which is suitable for accurately generating the teeth of a case-hardened face gear 112. Although the surface of the grinding worm 54 is complex, this surface can be generated automatically through either of two types of inventive dressing procedures. The procedure illustrated in FIGS. 9 and 10 comprises a simulation of tooth meshing between the dressing tool 56a and the spur pinion 73. This procedure is the subject of U.S. Provisional patent application Ser. No. 60/016,052, filed on Apr. 23, 1996 and entitled Apparatus For Precision Grinding Face Gears, the contents of which are expressly incorporated herein by reference. According to the technique of this co-pending application, which is assigned to the assignee of the present application, the spur pinion 73 shown in phantom in FIG. 9 is the actual spur pinion which will mesh with the face gear 112 during normal operation. As shown in FIG. 9, the dressing tool 56a of the co-pending application comprises a double concave surface, which is an internal sector of the spur pinion 73. In other words, the dressing tool tooth 58a is shaped to snugly fit between two teeth of the spur pinion 73. Thus, the dressing tool tooth 58a has an involute profile of an internal sector of the spur pinion 73. This dressing tool tooth 58a is shown in FIG. 10 fitting between a first grinding worm tooth 70 and a second grinding worm tooth 72. Since the dressing tool tooth 58a comprises an involute profile of the spur pinion 73, the dressing tool 56a tends to approximately maintain the shape of the grinding worm 54 to a shape similar to that of the spur pinion 73. Consequently, grinding of the face gear teeth 112 by the grinding worm 54 tends to prepare the teeth of the face gear 112 for eventual meshing with the teeth of the spur pinion 73.

The dressing tool 56a axis of rotation $Z_t$ is located a distance $E_{sw}$ from the grinding worm axis of rotation $Z_w$. The rotational motions of the grinding worm 54 and of the dressing tool 56a are related as follows:

$$\omega_w/\omega_t = N_s/N_w. \qquad 4$$

FIG. 10 illustrates movement of the dressing tool 56a along the single continuous grinding worm gap 67 of the grinding worm 54. The dressing tool tooth 58a enters the single continuous grinding worm gap 67 at an entry point 87, and begins contacting a portion of the second grinding worm tooth 72. As the grinding worm 54 rotates in the direction of the arrow A5 about the grinding worm axis $Z_w$, the dressing tool 56a travels along the single continuous grinding worm gap 67 to an intermediate position, where the dressing tool 56a contacts both the first grinding worm tooth 70 and the second grinding worm tooth 72. The dressing tool is shown at this intermediate position in phantom with the reference number 87. As the dressing tool continues to travel through the single continuous grinding worm gap 67 with rotation of the grinding worm 54, the dressing tool 56a continues to move in the direction of the arrow A7 about the dressing tool axis of rotation $Z_t$ (FIG. 5). The dressing tool exits the single continuous grinding worm gap 67 at the exit point 89, where the dressing tool is shown in phantom with the reference number 90 contacting only the outer portion of the first grinding worm tooth 70. The dressing tool 56a preferably moves through the entire single continuous grinding worm gap 67 with approximately three rotations of the grinding worm 54.

Rocking of the dressing tool 56a about the axis of rotation $Z_t$ (FIG. 5) simulates rocking of the spur pinion 73 (FIG. 9) over the face gear 112. In this simulation, the dressing tool 56a corresponds to a face gear tooth, and the grinding worm tooth corresponds to the spur pinion 73. If the shaper gear 18 (FIG. 6) were used to machine the teeth of the face gear 112, the trajectory of the tooth surface of the shaper gear 18 would have a trajectory defining an envelope surface. This envelope surface defines the tooth geometry of the face gear 112. The grinding worm 54 is designed to generate an envelope surface similar to that of the shaper gear 18. Turning back to FIG. 4, the dressing spur 45 of the prior art does not fully extend between the two hob teeth 32 and 34. Thus, the first and second hob teeth 32 and 34 are not dressed below the "form diameter," which is the lowest point of active profile on the teeth of the hob 25. As shown in FIG. 9, for example, the dressing tool 56a of the present invention fits into the form diameter of the grinding worm 54.

Although the dressing tool 56a of FIGS. 9 and 10 overcomes problems associated with the prior art, the presently preferred dressing tool 56 (FIG. 7) is considered to be even better. It has been discovered that a problem of undercutting can occur with the dressing tool 56a when a number of teeth 201 of the spur pinion 73 is less than 24, for example. More particularly, with reference to FIG. 10, when a number of teeth 201 of the spur pinion 73 is small, the relative size of each tooth 201 is large. Accordingly, when the number of teeth 201 of the spur pinion 73 is small, the dimensions of the dressing tool tooth 58a are relatively large. Additionally, when the number of spur pinion teeth 201 is small, the range of motion of the dressing tool 58a, indicated by the arrow A7 in FIG. 10, is relatively large. The large relative angle of rotation of the dressing tool 56a, coupled with the relatively large dimensions of the dressing tool tooth 58a, result in the undesired phenomena of undercutting. In such a situation where the number of spur pinion teeth 201 is relatively small, undercutting is likely to occur at the extreme angular orientations 56a and 90 (FIG. 10) of the dressing tool. At these extreme angular orientations, the tip of the dressing tool tooth 58a tends to cut too much into the grinding worm 54 at the positions 87 and 89, corresponding to the extreme angular orientations of the dressing tool 56a, 90, respectively, as illustrated in FIG. 10. Since the dressing tool 56a is configured as the compliment of the spur pinion 73, large angular orientations of the dressing tool 56a unavoidably result in undercutting as the dressing tool 56a exactly follows the angular motion of the spur pinion 73.

The presently preferred dressing tool 56 (FIG. 7), however, does not rely on exactly following the angular motion of the spur pinion 73. Instead, generally speaking, the dressing tool 56 traces the envelope formed buy the spur pinion 73 (FIG. 9) on the grinding worm 54 as a grinding worm 54 rotates.

The dressing tool 56 is not a compliment of the spur pinion 73 but, rather, comprises a plane which is controlled to always be in tangency with the spur pinion 73. The dressing tool 56 can effectively dress the grinding wheel 54 without following the angular motion of the spur pinion 73, because two independent variables of motion provide the required freedom for maintaining tangency conditions of the dressing tool 56 with the spur pinion 73, without exactly following the angular motion of the spur pinion 73. The dressing procedure associated with the dressing tool 56a is a function of only one variable, which is the angular orientation of the dressing tool 56a as the dressing tool 56a moves along the arrow A7 (FIG. 10). This one variable-enveloping process has difficulties in meeting special topological modification requirements on the spur pinion tooth 201 surface, which must generally be expressed using two independent variables. The two independent-variable approach utilized by the dressing tool 56 of the presently preferred embodiment provides for the possibility of introducing any desired topological modifications to the grinding worm 54 and, consequently, to the face gear teeth 114 and 116 (FIG. 8).

The grinding worm 54 of the presently preferred embodiment is thus generated by two-parametric enveloping of a family of surfaces. Referring to FIG. 7 and 9, the generating plane 58 of the dressing tool 56 is in theoretical line tangency with the spur pinion 73, and is in theoretical point contact with both the face gear 112 and the grinding worm 54. The motion of the plane 58 in two-parametric form, relative to the grinding worm 54, conforms to true conjugate conditions of the spur pinion 73, the face gear 112, and the grinding worm 54. Accordingly, the grinding worm 54 generated by the presently preferred embodiment will grind the face gear 112 with a true conjugate tooth profile of the spur pinion 73, thus providing smooth motion transmission when meshing with the pinion.

The two-parametric design of the dressing process of the presently preferred embodiment is not limited by undercutting problems associated with small numbers of spur pinion teeth 201 (for example, 24 to 28 spur pinion teeth 201) but, of course, this preferred dressing technique may still be affected by undercutting in the design of the spur pinion 73 itself. The two-parametric enveloping process allows for introduction of predesigned modifications to the grinding worm 54 along two directions on the thread surface, which can then be passed to the face gear teeth 114, 116 during grinding. Such topological modifications, if well designed, can produce parabolic-type transmission errors in the gear set to absorb linear-type transmission errors which are caused by machining and assembly inaccuracies.

Figure 11:
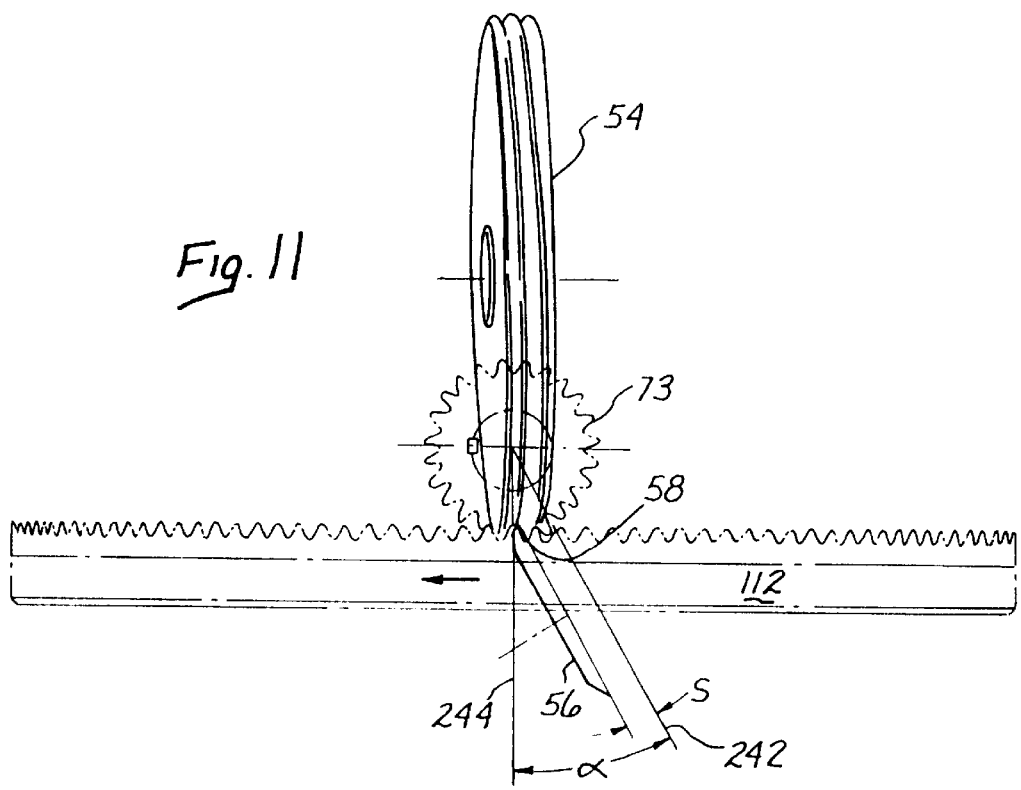
FIG. 11 illustrates an apparatus for placing the dressing tool into contact with the grinding worm, according to the present invention.

Turning to FIG. 11, the dressing tool 56 is shown in schematic form superimposed on the face gear 112. The spur pinion 73, shown in phantom, is also superimposed on the face gear 112 for illustrative purposes. The dressing tool 56 is moved with a complex motion that is generally designed to have the tip 58 trace the outline of the spur 73 while contacting and grinding the worm gear 54. As presently embodied, the motion of the dressing tool 56 can be represented or controlled by two independent variables α and S, as described below.

Four surfaces are considered in defining the movement of the dressing tool 56: (1) the surface of the spur pinion 73 $\Sigma_s$ as the basic member; (2) the surface of the face gear 112 tooth $\Sigma_g$ which is theoretically generated by the spur pinion surface $\Sigma_s$ with true conjugate action; (3) the surface of the grinding worm 54 $\Sigma_w$ that will actually finish the face gear tooth $\Sigma_g$ providing true conjugate action between the spur pinion surface $\Sigma_s$ and the face gear surface $\Sigma_g$; and (4) the dressing tool 56 surface $\Sigma_t$ that will generate the grinding worm $\Sigma_w$ satisfying the above requirements. Turning back to Equation 2, the teeth of the face gear 112 are generated as one-parametric enveloping of the spur pinion surface $\Sigma_s$, with the one-parametric being the rotation of the spur pinion 73. Instantaneously, two surfaces $\Sigma_s$ and $\Sigma_g$ are in line contact. The grinding process can be explained by adding a grinding worm 54 to the imaginary mesh of the spur pinion 73 and the face gear 112.

As presently embodied, the dressing tool 56 comprises a dressing disc having a flat surface 58, which is placed in tangency with the profile of the spur pinion 73 at any instant. As previously mentioned, this movement of the dressing tool 56 can be represented by two variables α and S. As shown in FIG. 11, α is defined as an angle formed between the two lines 242 and 244. Line 242 is parallel to the planar face 58 of the dressing tool 56 and is perpendicular to the rotational axis of the spur pinion 73. Line 244 is defined as passing through a line of shortest distance between the rotational axis of the spur pinion 73 and the rotational axis of the grinding wheel 54. The variable S is defined as a distance from the face 58 of the dressing tool 56 to a plane that is parallel to the face 58 of the dressing tool 56 and passing through the rotational axis of the spur pinion 73. The rotational motion of the grinding worm 54 is related to α and S as follows:

$$\phi_w = \frac{N_s}{N_g}(\alpha - S/r_b)$$

The variable $r_b$ is the base radius of the spur pinion 73, and the variable $\phi_w$ is the angle of rotation of the grinding worm 54. For every independently assigned set of values for α and S, the above Equation 5 yields a definite angle of rotation $\phi_w$ of the grinding worm 54. These corresponding variables determine the relative positions of the dressing tool 56 and the grinding worm 54 for any instant in time.

In real implementation, the dressing tool 56 and the grinding worm 54 move relatively to one another continuously following Equation 5. The movements are performed back and forth for contacting the threads of the grinding worm 54. When Equation 5 is met, the dressing tool 56 has the following meshing conditions: (1) the dressing tool 56 is in line tangency with the spur pinion 73, (2) the dressing tool 56 is in point contact with the face gear 112, and (3) the dressing tool 56 is in point contact with the grinding worm 54 with the point of contact being the intersection of the theoretical contact line of the α variable and that of the S variable.

Figure 12:
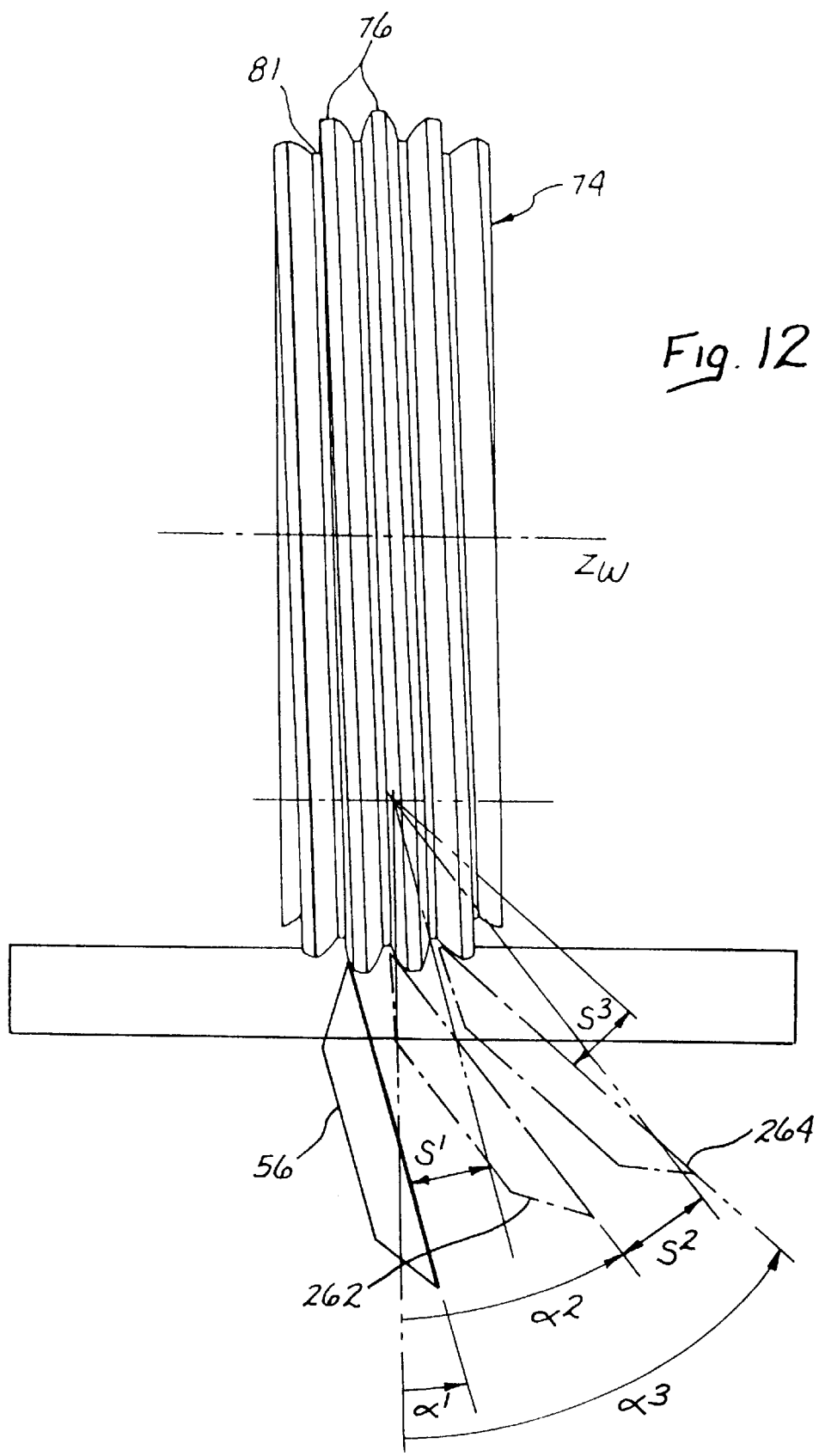
FIG. 12 illustrates movement of the dressing tool along the gap of the grinding worm, according to the present invention.

FIG. 12 illustrates three different positions of the dressing tool 56, with the latter two orientations, 262 and 264 shown in phantom. The angle $\alpha^1$ and the distance $S^1$ defining the orientation of the dressing tool 56, and the angle $\alpha^2$ and the distance $S^2$ defining the position of the dressing tool 262. Similarly, the angle $\alpha^3$ and the angle $S^3$ define the position of the dressing tool 264. The angle of rotation α and the distance S of the dressing tool are determined by Equation 5. For each specific set of values for α and S, the angle of rotation of the grinding wheel 54 is changed. Additionally, changing either value α or S, independently, will also change the angle of rotation of the grinding worm 54.

Figure 13:
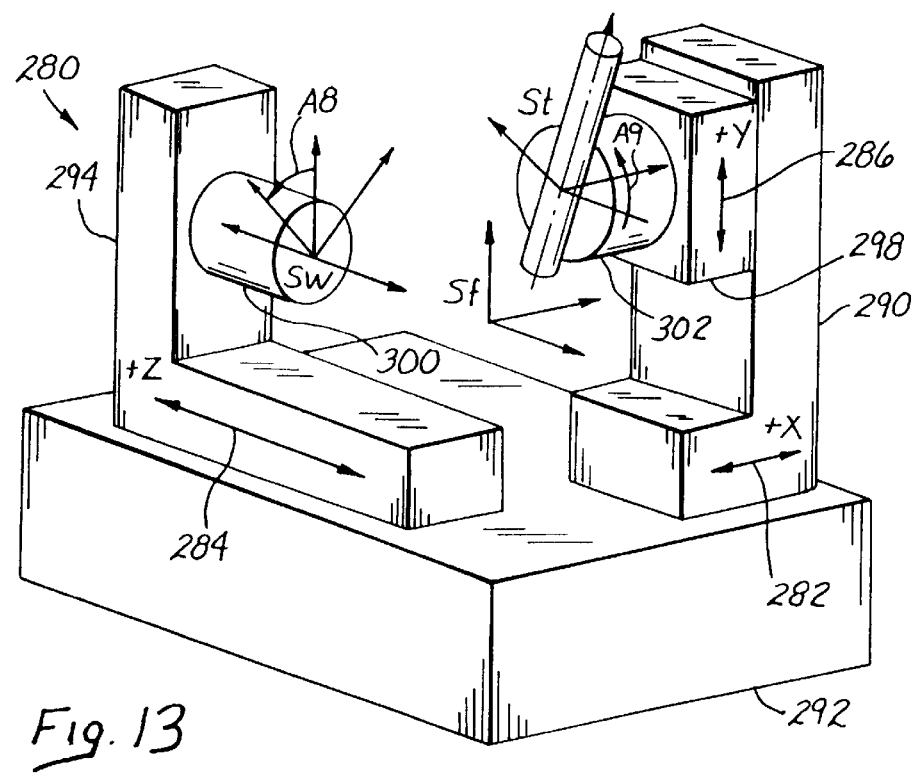
FIG. 13 illustrates an apparatus for moving the dressing tool along the surface of the grinding worm, according to the present invention.

FIG. 13 illustrates an apparatus 280 that is suitable for moving the dressing tool 56 along the surface of the grinding worm 54. The x-axis 282 is positive in the right direction, the z-axis 284 is positive in the left direction, and the y-axis 286 is positive in the upward direction, relative to the page on which FIG. 13 is shown. The arm 290 is moveable above the base 292 for achieving x-axis movement, and the arm 294 is moveable above the base 292 for achieving z-axis movement. An arm 298 is connected to the arm 290, and is adapted for achieving y-axis movement. The head stock spindle 300 is rotatable about its rotational axis, as is the cylinder 302. The grinding worm 54 to be dressed is mounted on the head stock spindle 300 with motion in the direction of the arrow A8 simulating the angle of rotation of the grinding worm 54. As presently embodied, the dressing tool 56 is mounted on the tool spindle 302 with motion in the direction of the arrow A9 simulating the angle α, and the linear variable S being simulated with the combination of the x, y and z movements of the arms 290, 294, and 298.

The dressing tool 56 of the presently preferred embodiment is especially advantageous when used in conunction with spur pinions having teeth fewer than 24–28. Such spur pinions are quite often desired in gear set designs with high reduction ratios. It is estimated that well over one half of face gear applications fall into this category. The two parametric enveloping process is especially suitable for applications requiring topological modifications on the face gear 112 tooth surface. Examples of such applications include specific tooth deviations purposefully introduced in the roughing process before heat treatment to compensate for distortions during heat treatment to thereby provide an even amount of finished grinding stocks and hardened case depth, and well designed tooth deviations introduced so that the contact pattern with the mating spur pinion can be localized and the shift of pattern under load can be controlled in size and direction. This latter application is especially important for high load applications where relatively large amounts of deflections are expected. The tooth surface can also be topologically modified with a two-pair metric enveloping process to provide prescribed parabolic-types of transmission errors that can absorb linear-type transmission errors induced by manufacturing errors and structure deflections. This tooth surface modification can substantially reduce the level of noise generated at the gear mesh, and is especially applicable to high speed applications. Additionally, the flat surface 58 of the dressing tool 56 renders the manufacture of the dressing tool 56 relatively simple and accurate.

The grinding worm 54 and dressing tool 56 combination of the present invention may be used to fabricate high quality straight faced gears, as well as helical faced gears. These gears may be treated to high hardness levels and precision ground by the grinding worm 54 and dressing tool 56 to thereby accommodate high power applications. Face gears of the prior art are generally suitable for control gears only. Face gears ground to AGMA class 10 quality or higher, using the present invention, can be used in high speed and high load applications wherever beveled gears, which have a more complex geometry, are utilized. Such applications include angular drives involving intersecting axes and crossed axis drive shafts. The potential cost savings of using face gears in lieu of beveled gears is substantial. Additionally, face gears are easier to install, since establishing the pinion and gear mounting distance is less difficult than with beveled gears. Moreover, face gears possess configurational advantages over other gears, such as the capability of driving two face gears from one pinion when the face gears are installed on opposite sides of the pinion. Accordingly, a dual feed drive for additional accessory equipment usage or a split of input engine torque may be utilized to provide lighter intermediate power paths. The split torque drive train may then be recombined prior to the final output. This split torque concept can provide substantial weight savings when applied to helicopter transmissions, for example.

Although an exemplary embodiment of the invention has been shown and described, many other changes, modifications and substitutions, in addition to those set forth in the above paragraphs, may be made by one having ordinary skill in the art without necessarily departing from the spirit and scope of this invention.

What is claimed is:

1. A method of precision grinding a plurality of face gear teeth on a face gear, the face gear teeth being adapted for meshing with a spur pinion, the method comprising the following steps:

providing a grinding worm, the grinding worm having a rotational axis;

rotating the grinding worm;

placing the rotating grinding worm into contact with the face gear to thereby precision grind the plurality of face gear teeth;

providing a dressing tool having a planar surface; and placing the planar surface of the dressing tool into contact with the rotating grinding worm to thereby true the rotating grinding worm, an envelope generated by the dressing tool as the dressing tool contacts and grinds the rotating grinding worm approximating an envelope that the dressing tool would generate if the dressing tool were moved over a surface of a spur pinion, the placing step including a step of moving the dressing tool in a feed direction that is always substantially perpendicular to the planar surface.

2. A precision grinding apparatus, comprising:

a case-hardened face gear adapted for meshing with a spur-pinion surface of a spur pinion, a curvilinear line being defined as a line along the spur-pinion surface that is generally parallel to a rotational axis of the spur pinion;

a grinding worm disposed in a substantially normal orientation to the case-hardened face gear, the grinding worm having a grinding worm-surface adapted for contacting and grinding the case-hardened face gear; and a dressing tool having a flat surface, which is adapted to contact and move along the grinding-worm surface and which, at the same time, is adapted to pass along but not intersect the curvilinear line, the dressing tool being adanced to move in a feed direction that is always substantially perpendicular to a plane formed by the flat surface.

3. The precision grinding apparatus according to claim 2, the grinding worm comprising a grinding worm rotational axis, and the dressing tool moving along both the curvilinear line and the grinding worm surface as the grinding worm rotates about the grinding worm rotational axis.

4. A precision grinding apparatus, comprising:

a case-hardened face gear adapted for meshing with spur-pinion teeth disposed on a spur-pinion surface, a curvilinear line being defined as a line along the spur-pinion surface that is generally transverse to the spur pinion teeth;

a grinding worm having a grinding worm rotational axis and adapted for being disposed in a substantially normal orientation to the case-hardened face gear, the grinding worm having a grinding-worm surface adapted for contacting and grinding the case-hardened face gear; and a dressing tool having a truncated cone shape and a planar grinding-worm contacting surface, the dressing tool being adapted for defining the curvilinear line on the surface of the grinding worm as the grinding worm rotates about the grinding worm rotational axis, the dressing tool being adapted to move in a feed direction that is always substantially perpendicular to a plane formed by the planar grinding-worm contacting surface.

5. The precision grinding apparatus according to claim 4, the case-hardened face gear comprising a plurality of gear teeth adapted for meshing with the spur-pinion teeth, each of the gear teeth extending radially from a center of the case-hardened face gear and positioned along an outer perimeter of the case-hardened face gear.

* * * * *